March 29, 1949.　　　W. H. NUGENT, JR　　　2,465,469
GRAIN SHOVEL

Filed Nov. 24, 1947　　　2 Sheets—Sheet 1

W. H. NUGENT, JR.
INVENTOR

BY Herbert J. Brown
ATTORNEY

March 29, 1949. W. H. NUGENT, JR 2,465,469
GRAIN SHOVEL

Filed Nov. 24, 1947 2 Sheets-Sheet 2

W. H. NUGENT, JR.
INVENTOR

BY Herbert J. Brown
ATTORNEY

Patented Mar. 29, 1949

2,465,469

UNITED STATES PATENT OFFICE 2,465,469

GRAIN SHOVEL

William H. Nugent, Jr., Fort Worth, Tex.

Application November 24, 1947, Serial No. 787,698

1 Claim. (Cl. 214—44)

This invention relates to grain unloading equipment and has reference to an improved construction for a grain unloading shovel.

Shovels for this purpose have been heretofore made of wood and were relatively heavy and wore out in a surprisingly short length of time. It was impractical to make such shovels of steel because they would be too heavy for an operator to handle for any length of time. It is therefore an object of the present invention to provide a construction and arrangement for a grain unloading shovel which is not only light weight, but one which is durable and may be used for longer periods of time than the wooden shovels referred to.

Another object of the invention is to provide an arrangement of parts, including a handle construction, which is not only convenient to handle, but one which may be made at a relatively low cost.

These and other objects of the invention will become apparent from the following description of the accompanying drawings, wherein.

Figure 1:
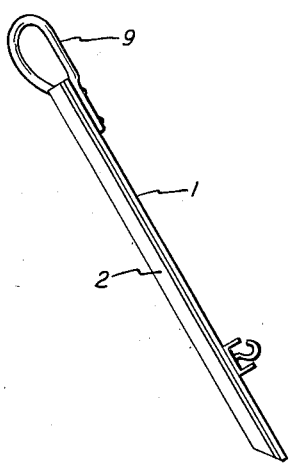
Figure 1 is a side elevational view of a grain unloading shovel embodying the features of the present invention.
Figure 2:
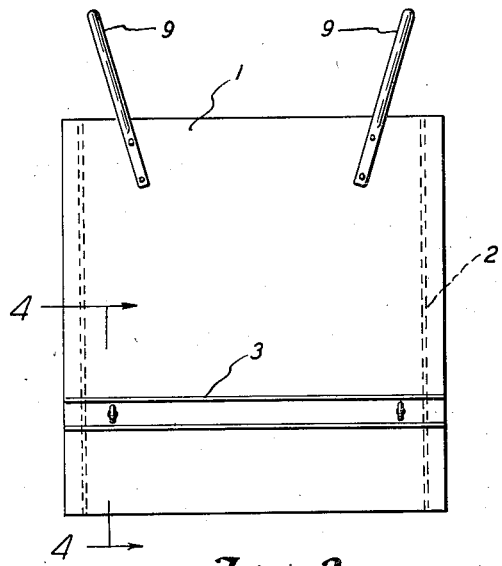
Figure 2 is a front elevational view of the shovel shown in Figure 1.

A grain unloading shovel made in accordance with the present invention and illustrated in Figures 1 and 2, is comprised of a substantially square blade 1 of sheet magnesium and having angle stock stiffeners 2 along each side and secured to the rear surface of the blade by suitable means, such as spot welding or riveting (not shown). A cross member 3 of channel stock is secured to the face of the blade relatively near and parallel with the lower blade edge. In this form of the invention the channel 3 is located within the lower one-third of the blade surface.

Figure 3:
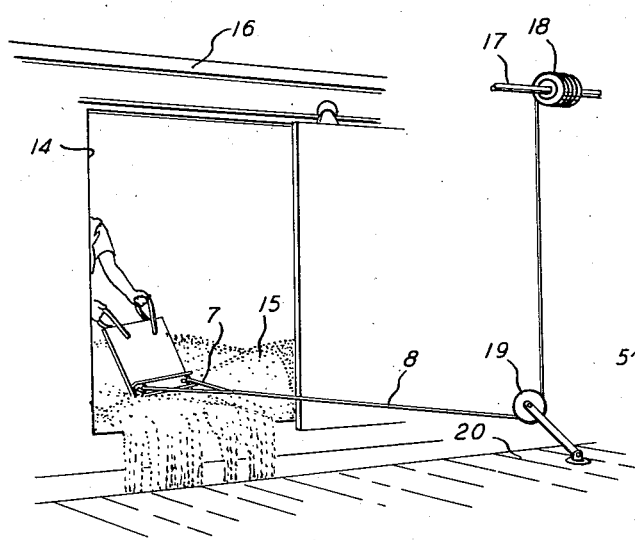
Figure 3 is a perspective view of a box car door and showing an arrangement for operating the present shovel.
Figure 4:
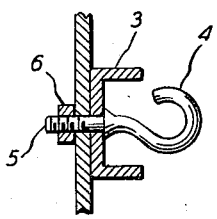
Figure 4 is a sectional view taken on lines 4—4 of Figure 2, and showing the relation between the shovel blade, the cross member stiffener on the face of the blade, and a hook and bolt arrangement for attaching a cable bridle thereto.

Within the channel stiffener 3 there are spaced hook bolts 4, the shanks 5 of which extend through the said stiffener and the blade 1, and are secured in place by nuts 6 which bear against the rear surface of the blade. The last referred to arrangement of bolts and hooks 4 is for engaging a bridle 7 at the end of a cable 8, as shown in Figure 3.

Figure 5:
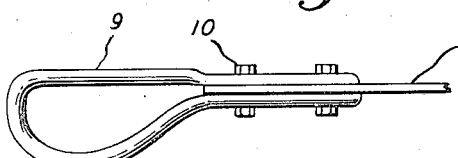
Figure 5 is a side elevational view of a handle, such as secured to the upper edge of the blade of the shovel shown in Figures 1 and 2.

The upper edge of the blade 1 is provided with looped handles 9, the ends of which are respectively secured to the face and rear surface of the blade by bolts 10, as shown in Figure 5. The handles are angularly disposed with respect to the sides of the blade 1, as shown in Figure 2, for natural and convenient handling by the shovel operator.

Figure 6:
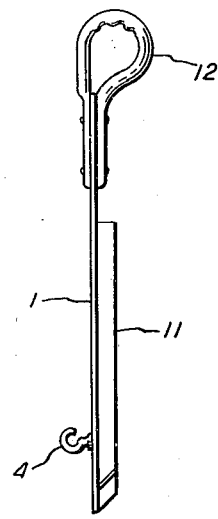
Figure 6 is a side elevational view of another form of the invention.
Figure 7:
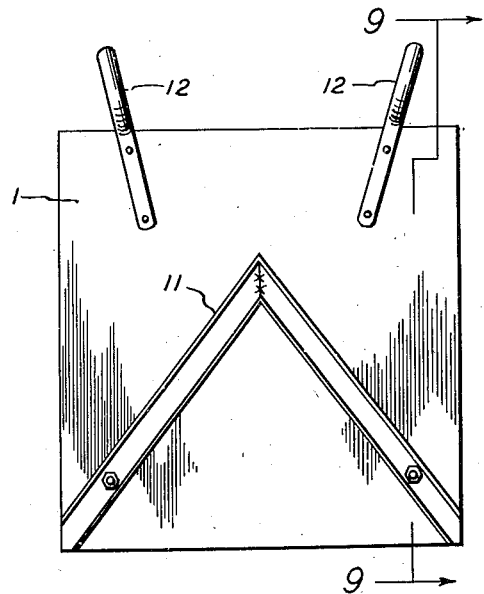
Figure 7 is an elevational view of the rear surface of the shovel shown in Figure 6, and particularly showing a stiffener arrangement for further lightening the shovel construction.

The form of the invention illustrated in Figures 6 and 7 includes the described blade 1, but provides an A-shaped channel stiffener 11 on the rear face thereof in place of the side stiffeners 2 and the horizontal stiffener 3 heretofore described. The stiffener 11 may be made of two parts and welded at the apex, as shown in Figure 7, or may be made of one continuous piece and bent at the apex. The hook bolts 4 in this form of the invention are positioned through the face of the blade 1 at points which place the shanks 5 of the hooks through opposite legs of the A-shaped channel stiffener 11, and are secured therein by nuts 6.

Figure 8:
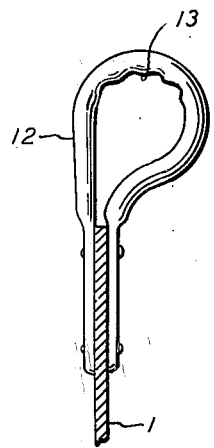
Figure 8 is a side elevational view of a modified form of handle and is shown attached to a sectional portion of the upper edge of the shovel blade.
Figure 9:
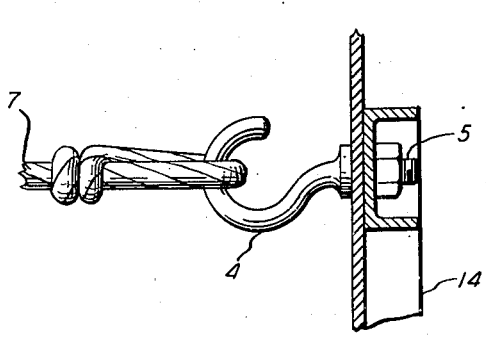
Figure 9 is a sectional view taken on lines 9—9 of Figure 7 and showing a hook arrangement, similar to Figure 4, as applied to the stiffener illustrated in Figures 6 and 7.

The modified form of handle 12 shown in Figures 6, 7, and 8, is similar to the one shown in Figures 1, 2, and 5, but differs in that the looped portion thereof is rounder and includes finger recesses 13 in the inner diameter. These handles may be employed in either of the described forms of the invention and are angularly disposed with reference to the sides of the blade 1, and are secured to both the front and rear surface of the said blade. In operation either of the described forms of the invention is attached to the cable 8 by means of the bridle 7 which is secured to the hook bolts 4. When opening a box car door 14, part of the grain 15 falls out of the car 16, but the remainder of the grain must be moved outwardly through the door. The grain 15 is then shoveled through the door 10 by sinking the lower edge of the blade 1 into the grain and by actuating the power shaft 17 and turning a drum 18 mounted thereon. The cable 8 is wound on the drum 18 and is also provided with a pulley 19 mounted on the grain unloading rack 20. The operation is repeated, moving the shovel farther into the car 16 each time, until all of the grain is removed.

The form of the invention shown is not restrictive, but may be made in many ways within the scope of the appended claim.

What is claimed is:

A grain unloading shovel comprising a substantially square blade of sheet magnesium, elongated stiffener means secured to the face of said blade, hook bolts positioned through said stiffener means and secured to said blade, handles secured to the said blade near the upper end thereof, and a bridle secured to said bolts.

WILLIAM H. NUGENT, Jr.

REFERENCES CITED

The following references are of record in the file of this patent:

UNITED STATES PATENTS

| Number | Name | Date |
|---|---|---|
| 137,848 | Lamb | Apr. 15, 1873 |
| 276,684 | Hanley | May 1, 1883 |
| 461,711 | Preston | Oct. 20, 1891 |
| 1,517,341 | Bulger | Dec. 2, 1924 |
| 1,609,107 | Beach et al. | Nov. 30, 1926 |

FOREIGN PATENTS

| Number | Country | Date |
|---|---|---|
| 2,704 | Great Britain | July 2, 1880 |